(12) United States Patent
Yang et al.

(10) Patent No.: US 10,535,481 B2
(45) Date of Patent: Jan. 14, 2020

(54) MAGNETIC KEYSWITCH AND RELATED MAGNETIC KEYBOARD

(71) Applicant: DARFON ELECTRONICS CORP., Taoyuan (TW)

(72) Inventors: Sung-Fu Yang, Taoyuan (TW); Po-Chun Hou, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 90 days.

(21) Appl. No.: 15/904,444

(22) Filed: Feb. 26, 2018

(65) Prior Publication Data

US 2019/0035581 A1    Jan. 31, 2019

(30) Foreign Application Priority Data

Jul. 28, 2017 (TW) .............................. 106125459 A

(51) Int. Cl.
*H01H 36/00* (2006.01)
*G06F 3/02* (2006.01)
*H01H 13/70* (2006.01)

(52) U.S. Cl.
CPC ....... *H01H 36/0006* (2013.01); *G06F 3/0202* (2013.01); *H01H 13/70* (2013.01)

(58) Field of Classification Search
CPC .. G06F 3/0202; H01H 13/70; H01H 36/0006; H01H 3/122; H01H 3/125; H01H 3/506; H01H 3/503; H01H 2221/04
See application file for complete search history.

(56) References Cited

U.S. PATENT DOCUMENTS

| | | | | |
|---|---|---|---|---|
| 8,970,331 | B2 * | 3/2015 | Chang | H01H 13/702 200/341 |
| 9,236,204 | B2 * | 1/2016 | Hsu | H01H 13/14 |
| 9,412,535 | B2 * | 8/2016 | Hsu | H01H 13/14 |
| 9,905,380 | B2 * | 2/2018 | Huang | H01H 1/54 |
| 9,984,840 | B2 * | 5/2018 | Hsu | H01H 13/85 |
| 10,381,175 | B2 * | 8/2019 | Yang | H01H 13/14 |
| 2013/0126323 | A1 * | 5/2013 | Hsu | H01H 13/02 200/341 |
| 2014/0231234 | A1 * | 8/2014 | Hsu | H01H 13/52 200/5 A |

FOREIGN PATENT DOCUMENTS

| CN | 106415765 A | 2/2017 |
|---|---|---|
| TW | 201640544 A | 11/2016 |

\* cited by examiner

*Primary Examiner* — Bernard Rojas
(74) *Attorney, Agent, or Firm* — Winston Hsu

(57) ABSTRACT

A magnetic keyboard has a plurality of magnetic keyswitches, and each magnetic keyswitch include a base, a keycap, a supporting device, a magnetic component and a metal thin sheet. The base has at least one engaging structure and a hole. The supporting device has a first support, an end of the first support is movably connected to the engaging structure, and the other end of the first support is movably connected to the keycap. The first support has a magnet portion. The magnetic component is disposed on the base and functioned with the magnet portion to provide a recovering force to the keycap. The metal thin sheet is disposed under the base and has a bendable cantilever portion covering the hole. While the cantilever portion is bent by an external force, the magnetic component can be removed through the hole.

10 Claims, 6 Drawing Sheets

MAGNETIC KEYSWITCH AND RELATED MAGNETIC KEYBOARD

BACKGROUND OF THE INVENTION

1. Field of the Invention

The present invention relates to a magnetic keyswitch and magnetic keyboard, and more particularly, to a magnetic keyswitch and magnetic keyboard with reused function and preferred structural stability and assembly strength.

2. Description of the Prior Art

A conventional magnetic keyswitch includes a base, a keycap, a supporting device, a magnetic component and a thin film. The supporting device is disposed between the base and the keycap, so that the keycap can be moved relative to the base upwardly and downwardly. The magnetic component is disposed on the base and utilizes a magnet portion of the supporting device to provide a recovering force to the keycap. The thin film is made of isolation material, such as Mylar, and disposed on the base for protecting electronic components. An accommodating space inside the magnetic keyswitch for the magnetic component and the magnet portion is limited because the conventional keyswitch has a trend of thin-typed design, so that a magnetic attraction force generated by the magnetic component and the magnet portion is weak and cannot provide sufficient operational feel. In addition, the thin film is directly pasted on the base; the thin film has to be cut off for removal of elements disposed inside the keyswitch, and the damaged thin film cannot be reused. The conventional magnetic keyswitch spends extra cost of a new thin film in replacement.

SUMMARY OF THE INVENTION

The present invention provides a magnetic keyswitch and magnetic keyboard with reused function and preferred structural stability and assembly strength for solving above drawbacks.

According to the claimed invention, a magnetic keyswitch includes a base, a keycap, a supporting device, a magnetic component and a metal thin sheet. The base has at least one engaging structure and a hole. The supporting device has a first support. An end of the first support is movably connected to the engaging structure, and the other end of the first support is movably connected to the keycap. The first support has a magnet portion. The magnetic component is disposed on the base and functioned with the magnet portion to provide a recovering force to the keycap. The metal thin sheet is disposed under the base and has a bendable cantilever portion used to cover the hole. The magnetic component is removed through the hole while the cantilever portion is bent by an external force.

According to the claimed invention, a magnetic keyboard includes a base, a plurality of magnetic keyswitches and a metal thin sheet. The base has a plurality of engaging structures and a plurality of holes. Each magnetic keyswitch includes a keycap, a supporting device and a magnetic component. The supporting device has a first support. An end of the first support is movably connected to a corresponding engaging structure, and the other end of the first support is movably connected to the keycap. The first support has a magnet portion. The magnetic component is disposed on the base and functioned with the magnet portion to provide a recovering force to the keycap. The metal thin sheet is disposed under the base and has a plurality of bendable cantilever portions used to cover the plurality of holes. The magnetic component is removed through a corresponding hole while one of the cantilever portions is bent by an external force.

The present invention forms the hole on the base to accommodate the magnetic component, and the cantilever portion can hold the magnetic component while the metal thin sheet is disposed by the base, so as to prevent the magnetic component from being separated from the base. If quality of the magnetic component is degraded, the user can manually bend the cantilever portion to uncover the hole, so the magnetic component can be removed through the hole for replacement. After that, the cantilever portion can be recovered to the initial status to hold the magnetic component, which means the metal thin sheet can be reused in replacement of the magnetic component for economizing rework cost. Besides, the metal thin sheet can be optionally made of material with magnetic permeability, so the metal thin sheet can directly attract the magnetic component to effectively increase the magnetic attraction force of the magnetic component, and structural stability and assembly strength of the thin-typed magnetic keyboard can be conspicuously advanced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
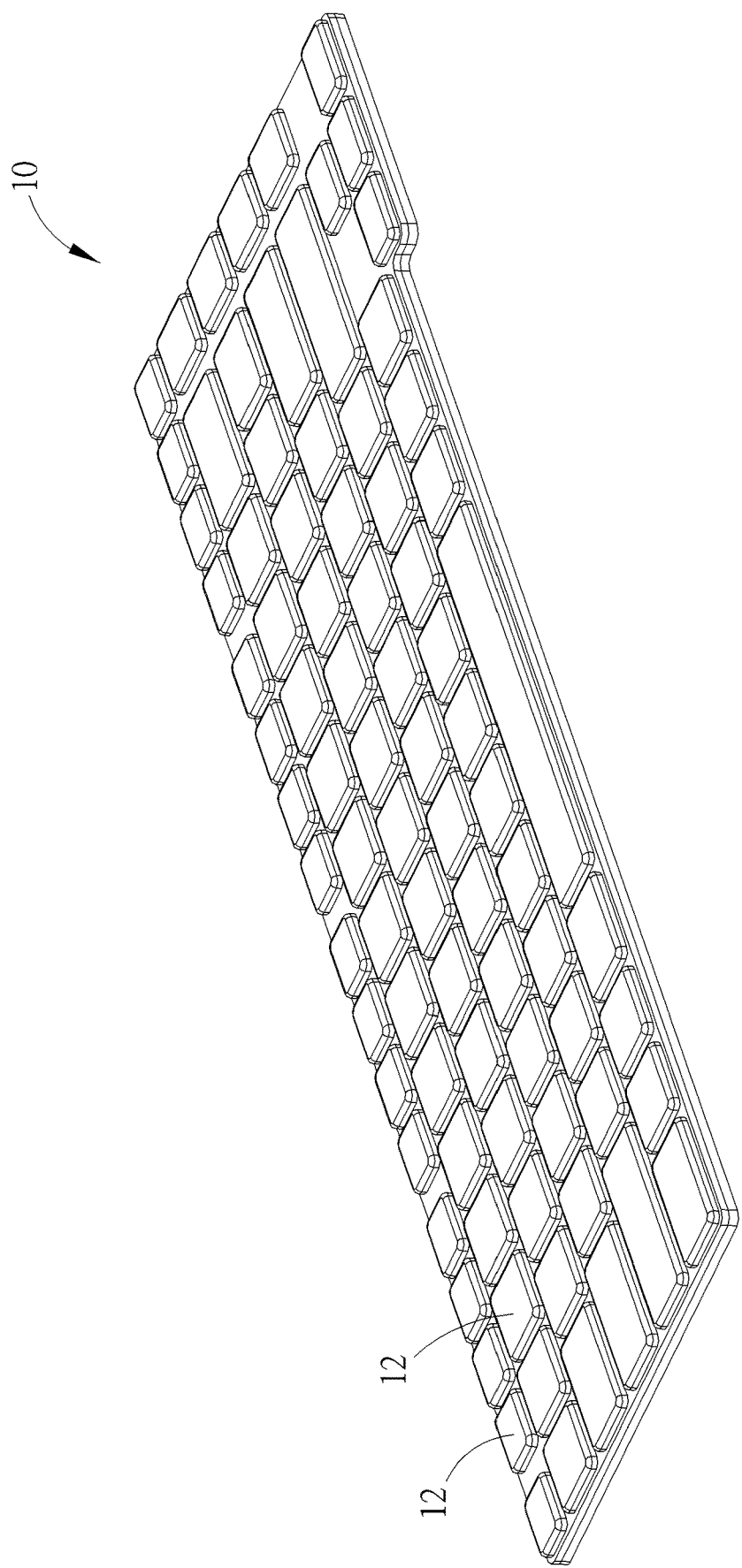
FIG. 1 is a diagram of a magnetic keyboard according to an embodiment of the present invention.
Figure 2:
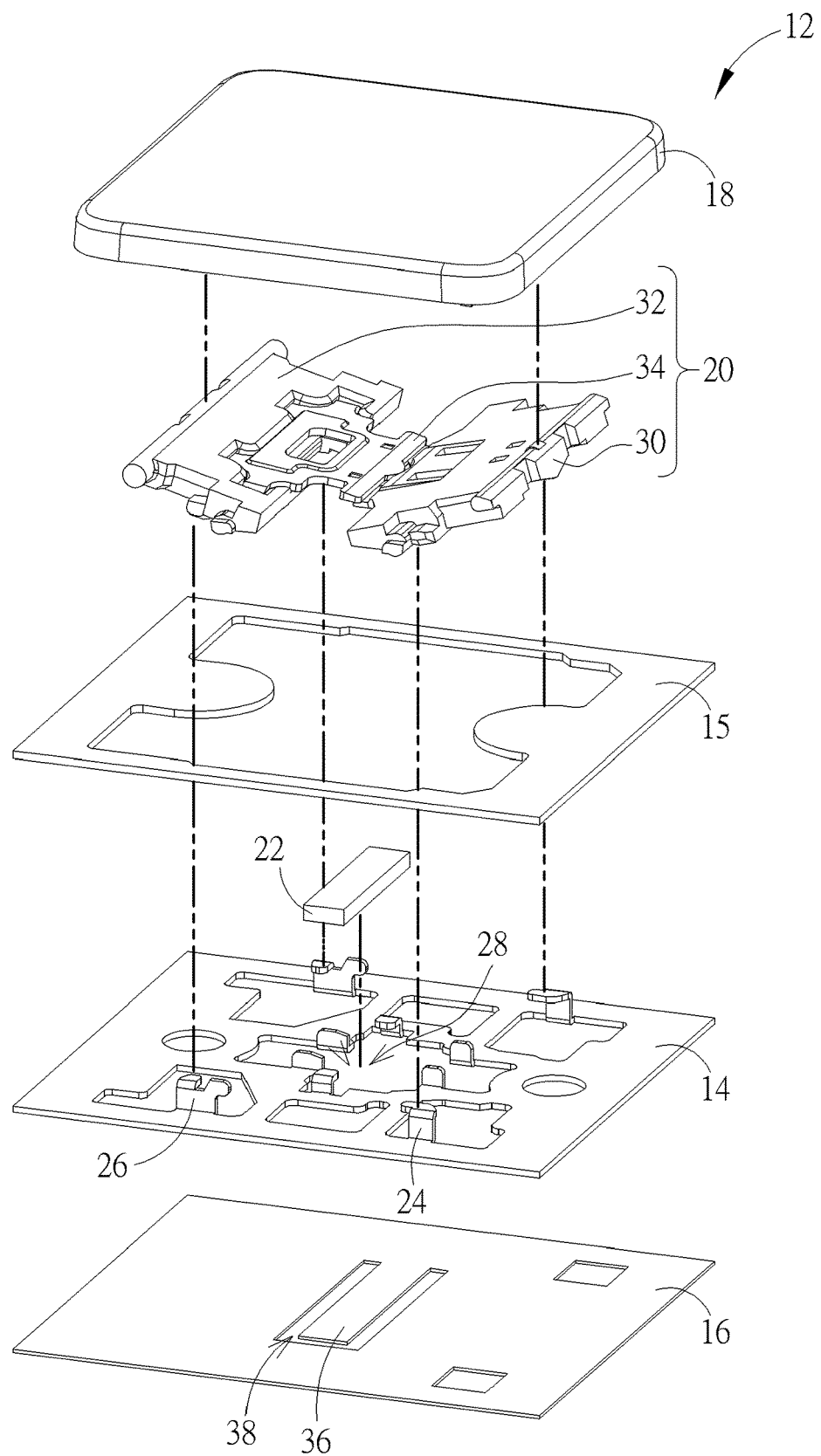
FIG. 2 is an exploded diagram of a magnetic keyswitch according to the embodiment of the present invention.
Figure 3:
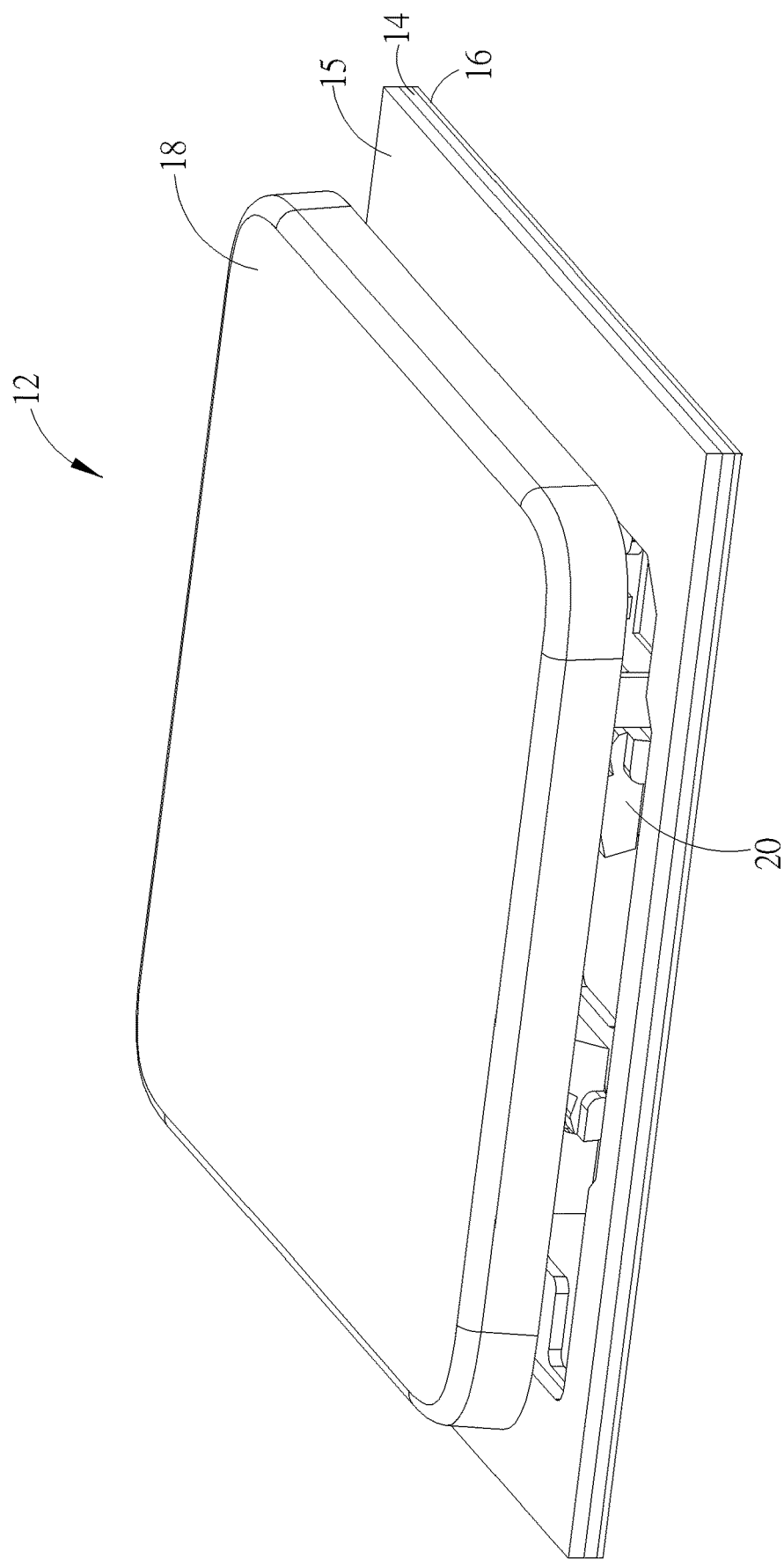
FIG. 3 is an assembly diagram of the magnetic keyswitch according to the embodiment of the present invention.
Figure 4:
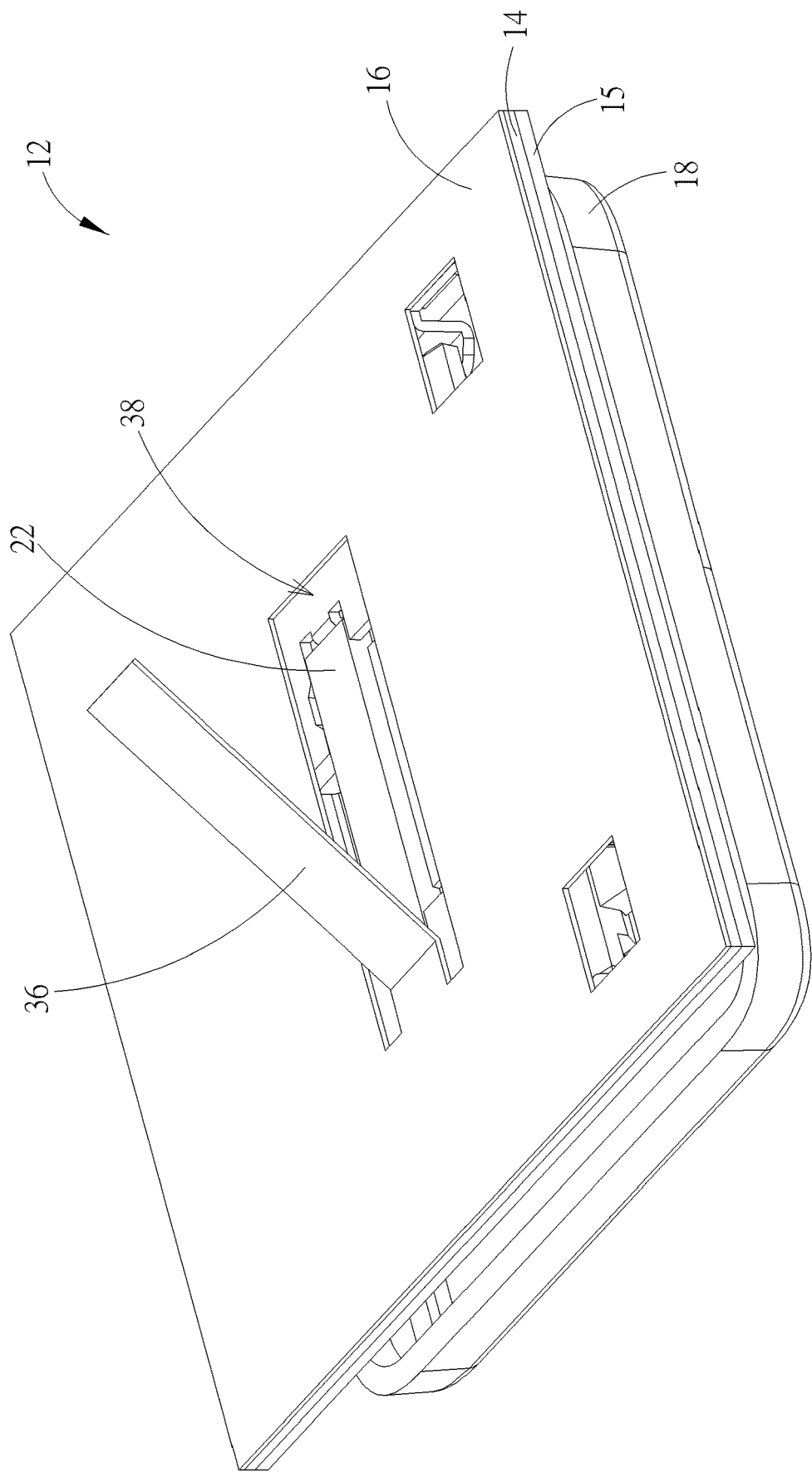
FIG. 4 and FIG. 5 respectively are diagrams of the magnetic keyswitch in different operational modes according to the embodiment of the present invention.
Figure 5:
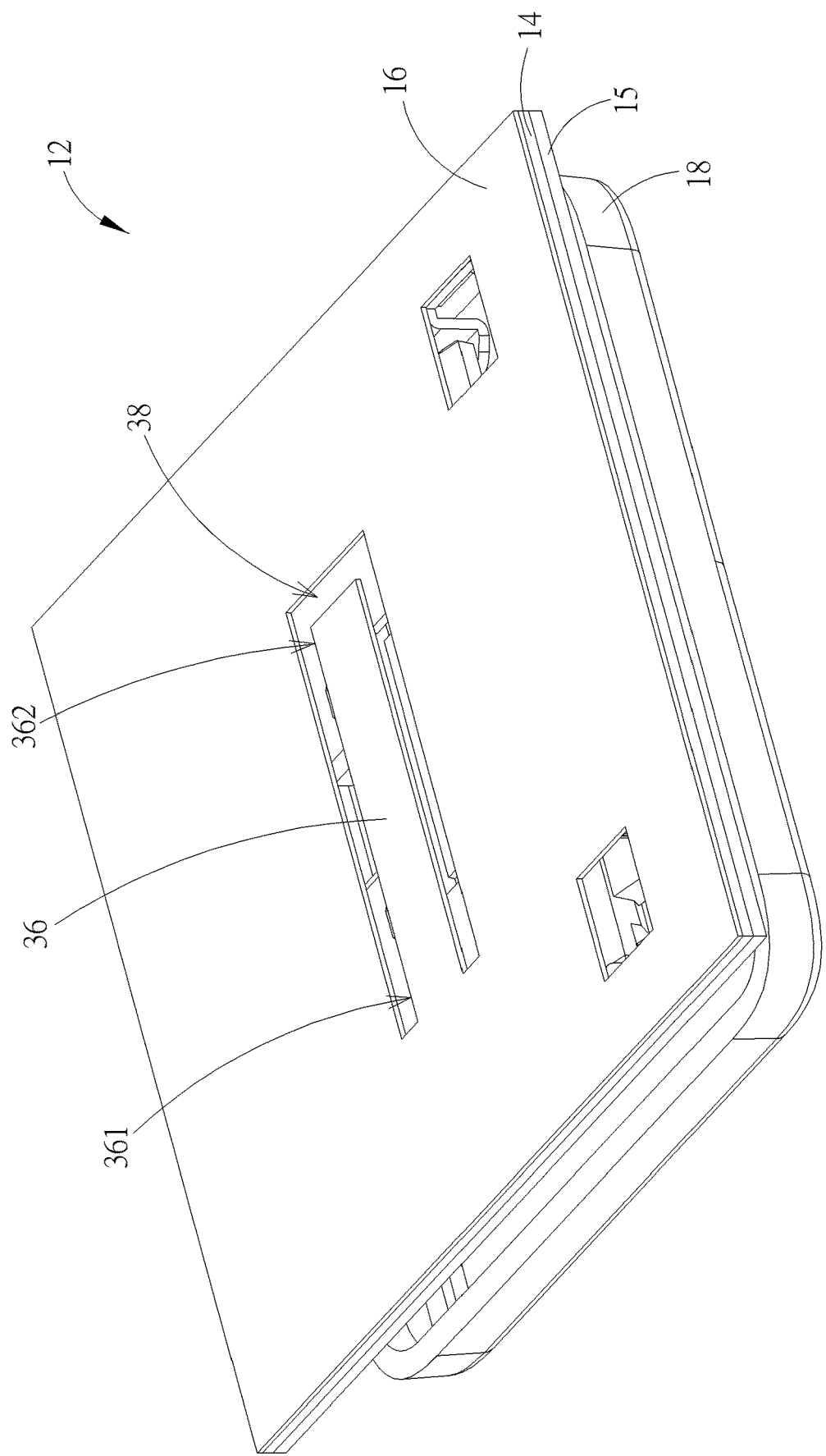

Please refer to FIG. 1 to FIG. 5. FIG. 1 is a diagram of a magnetic keyboard 10 according to an embodiment of the present invention. FIG. 2 is an exploded diagram of a magnetic keyswitch 12 according to the embodiment of the present invention. FIG. 3 is an assembly diagram of the magnetic keyswitch 12 according to the embodiment of the present invention. FIG. 4 and FIG. 5 respectively are diagrams of the magnetic keyswitch 12 in different operational modes according to the embodiment of the present invention. The magnetic keyboard 10 can have a plurality of keyswitches 12 according to design demand, and the plurality of keyswitches 12 is disposed on a base 14. A metal thin sheet 16 is disposed under the base 14. The metal thin sheet 16 can have large dimensional design which corresponds to dimensions of the base 14, and the metal thin sheet 16 is directly disposed under the base 14. Further, the metal thin sheet 16 may be small dimensional design corresponding to the magnetic keyswitch 12, which means each magnetic keyswitch 12 has the related metal thin sheet 16, or an assembly of several magnetic keyswitches 12 share the related metal thin sheet 16 with large sizes.

The magnetic keyswitch 12 can mainly include a base 14, a membrane 15, a metal thin sheet 16, a keycap 18, a supporting device 20 and a magnetic component 22. A first engaging structure 24, a second engaging structure 26 and a hole 28 are formed on the base 14. The supporting device 20 can include a first support 30 and a second support 32. An end of the first support 30 is movably connected to the first engaging structure 24, and the other end of the first support 30 is movably connected to the keycap 18. A magnet portion 34 is disposed on a middle of the first support 30. An end of the second support 32 is movably connected to the second engaging structure 26, and the other end of the second support 32 is movably connected to the keycap 18. The magnetic component 22 is connected to the base 14 through the hole 28; for example, two ends of the magnetic component 22 are engaged with inner walls of the hole 28. The magnetic component 22 is used to attract the magnet portion 34 disposed on the first support 30. Therefore, keycap 18 can be moved relative to the base 14 by the supporting device 20, and provide a recovering force to the keycap 18 via magnetic effect between the magnetic component 22 and the magnet portion 34.

The metal thin sheet 16 is disposed under the base 14, and has a bendable cantilever portion 36. The cantilever portion 36 can align with or be partly overlapped with the hole 28, and further can touch or abut against the magnetic component 22. The metal thin sheet 16 can be made of several kinds of material. For example, the metal thin sheet 16 can be made of SUS304 material, and the magnetic component 22 is held by material rigidity of the metal thin sheet 16. For replacement of the magnetic component 22, the cantilever portion 36 is bent and the magnetic component 22 can be easily removed through the hole 28, as shown in FIG. 4. After the magnetic component 22 is put into the base 14, the cantilever portion 36 can be recovered to an initial status by an external force, as shown in FIG. 5. In addition, the metal thin sheet 16 made of SUS304 material not only can provide rework function as mentioned above, but also can increase a magnetic attraction force of the magnetic component 22 applied to the magnet portion 34 for optimizing operational feel of the magnetic keyswitch 12.

In the embodiment of the present invention, an opening structure 38 can be formed on position of the metal thin sheet 16 corresponding to the magnetic component 22. An end 361 of the cantilever portion 36 is connected to an inner wall of the opening structure 38, and the other end 362 of the cantilever portion 36 is a free end. The free end does not contact the inner wall of the opening structure 38. The user can pull the free end 362 of the cantilever portion 36 to easily bend the cantilever portion 36, so the magnetic component 22 can be removed accordingly. The cantilever portion of the metal thin sheet 16 is not limited to the above-mentioned embodiment.

Figure 6:
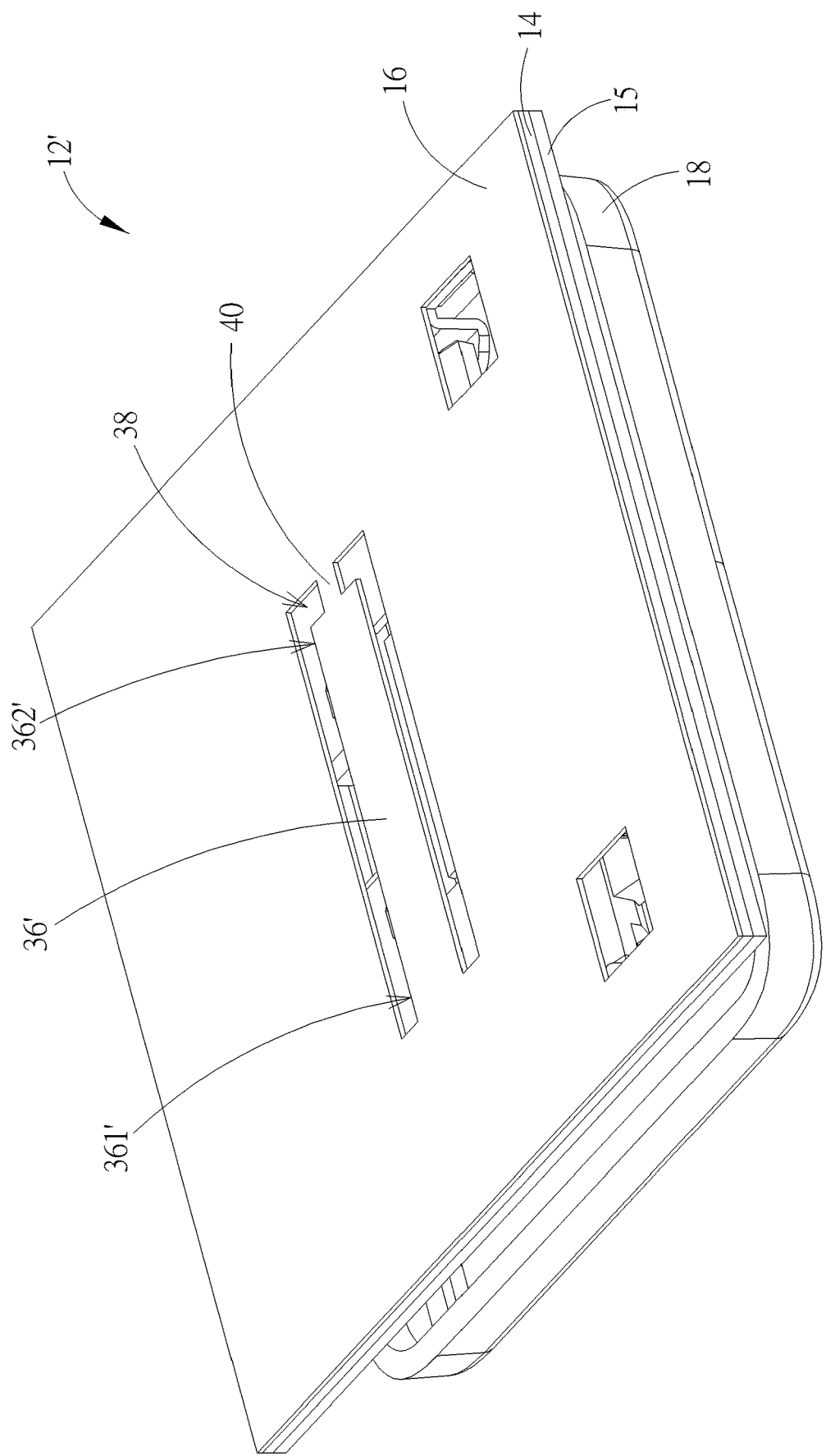
FIG. 6 is a diagram of the magnetic keyswitch according to another embodiment of the present invention.

Please refer to FIG. 6. FIG. 6 is a diagram of the magnetic keyswitch 12' according to another embodiment of the present invention. In the embodiment, elements having the same numerals as ones of the above-mentioned embodiment have the same structures and functions, and a detailed description is omitted herein for simplicity. The magnetic keyswitch 12' includes the opening structure 38 formed on the position of the metal thin sheet 16 corresponding to the magnetic component 22; an end 361' of the cantilever portion 36' is connected to the inner wall of the opening structure 38, and the other end 362' of the cantilever portion 36' is connected to the other inner wall of the opening structure 38 via a bridging portion 40. Contact area between the bridging portion 40 and the end 362' of the cantilever portion 36' or between the bridging portion 40 and the inner wall of the opening structure 38 is smaller than a width of the cantilever portion 36', so that connection about the contact area can be easily damaged by the external force to bend the cantilever portion 36' for replacement of the magnetic component 22.

In conclusion, the present invention forms the hole on the base to accommodate the magnetic component, and the cantilever portion can hold the magnetic component while the metal thin sheet is disposed by the base, so as to prevent the magnetic component from being separated from the base. If quality of the magnetic component is degraded, the user can manually bend the cantilever portion to uncover the hole, so the magnetic component can be removed through the hole for replacement. After that, the cantilever portion can be recovered to the initial status to hold the magnetic component, which means the metal thin sheet can be reused in replacement of the magnetic component for economizing rework cost. Besides, the metal thin sheet can be optionally made of material with magnetic permeability, so the metal thin sheet can directly attract the magnetic component to effectively increase the magnetic attraction force of the magnetic component, and structural stability and assembly strength of the thin-typed magnetic keyboard can be conspicuously advanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic keyswitch, comprising:
    a base having at least one engaging structure and a hole;
    a keycap;
    a supporting device having a first support, an end of the first support being movably connected to the engaging structure and the other end of the first support being movably connected to the keycap, the first support having a magnet portion;
    a magnetic component disposed on the base and functioned with the magnet portion to provide a recovering force to the keycap; and
    a metal thin sheet disposed under the base and having a bendable cantilever portion used to cover the hole, the magnetic component being removed through the hole while the cantilever portion is bent by an external force.

2. The magnetic keyswitch of claim 1, wherein an opening structure is formed on position of the metal thin sheet corresponding to the magnetic component, an end of the cantilever portion is connected to an inner wall of the opening structure, and the other end of the cantilever portion is a free end.

3. The magnetic keyswitch of claim 1, wherein an opening structure is formed on position of the metal thin sheet corresponding to the magnetic component, an end of the cantilever portion is connected to an inner wall of the opening structure, and the other end of the cantilever portion is connected to the other inner wall of the opening structure via a bridging portion.

4. The magnetic keyswitch of claim 1, wherein the metal thin sheet is made of SUS304 material.

5. The magnetic keyswitch of claim 1, wherein the metal thin sheet is made of SUS304 material to increase a magnetic attraction force of the magnetic component applied to the magnet portion.

6. A magnetic keyboard, comprising:
- a base having a plurality of engaging structures and a plurality of holes;
- a plurality of magnetic keyswitches, each magnetic key switch comprising:
  - a keycap;
  - a supporting device having a first support, an end of the first support being movably connected to a corresponding engaging structure and the other end of the first support being movably connected to the keycap, the first support having a magnet portion; and
  - a magnetic component disposed on the base and functioned with the magnet portion to provide a recovering force to the keycap; and
- a metal thin sheet disposed under the base and having a plurality of bendable cantilever portions used to cover the plurality of holes, the magnetic component being removed through a corresponding hole while one of the cantilever portions is bent by an external force.

7. The magnetic keyboard of claim 6, wherein an opening structure is formed on position of the metal thin sheet corresponding to the magnetic component, an end of the cantilever portion is connected to an inner wall of the opening structure, and the other end of the cantilever portion is a free end.

8. The magnetic keyboard of claim 6, wherein an opening structure is formed on position of the metal thin sheet corresponding to the magnetic component, an end of the cantilever portion is connected to an inner wall of the opening structure, and the other end of the cantilever portion is connected to the other inner wall of the opening structure via a bridging portion.

9. The magnetic keyboard of claim 6, wherein the metal thin sheet is made of SUS304 material.

10. The magnetic keyboard of claim 6, wherein the metal thin sheet is made of SUS304 material to increase a magnetic attraction force of the magnetic component applied to the magnet portion.

\* \* \* \* \*